United States Patent [19]

Newman

[11] Patent Number: 4,869,453
[45] Date of Patent: Sep. 26, 1989

[54] BICYCLE STAND AND ANTI-THEFT DEVICE

[76] Inventor: Joseph S. Newman, 6824 Fulton St., San Diego, Calif. 92111

[21] Appl. No.: 254,031

[22] Filed: Oct. 6, 1988

[51] Int. Cl.$^4$ ............................................. F16M 13/00
[52] U.S. Cl. .................................. 248/552; 280/297; 280/301
[58] Field of Search ................ 248/552; 280/297, 301, 280/298; 70/235; 211/22, 20, 21, 17

[56] References Cited

U.S. PATENT DOCUMENTS

| | | | |
|---|---|---|---|
| 571,433 | 11/1896 | Farnsworth | 280/297 X |
| 571,700 | 11/1896 | Smith | 280/297 |
| 581,107 | 4/1897 | Emery | 280/301 X |
| 1,468,161 | 9/1923 | Laystrom | 280/297 |
| 3,712,640 | 1/1973 | Shipman | 280/301 |
| 4,008,587 | 2/1977 | Frentzel | 248/552 X |
| 4,015,718 | 4/1977 | Bernard | 211/22 X |

FOREIGN PATENT DOCUMENTS

| | | | |
|---|---|---|---|
| 439207 | 1/1927 | Fed. Rep. of Germany | 280/297 |
| 910507 | 5/1954 | Fed. Rep. of Germany | 280/301 |
| 30112 | 11/1909 | Sweden | 280/301 |
| 23044 | 10/1896 | United Kingdom | 211/22 |

*Primary Examiner*—J. Franklin Foss
*Attorney, Agent, or Firm*—Charmasson & Holz

[57] ABSTRACT

A deployed device projects through the spokes of a rear wheel and supports a bicycle from a two strut portion of the bicycle frame. A first bar member is placed between spokes and one end is hooked over a first frame strut. This first bar member bears up against the lower portion of a second parallel strut while held in place by the hooked first strut. A second projecting member is hinged at a first end to the other end of the first bar and engages the ground at the second end to support the bicycle in a nearly upright position. The projecting element is also capable of telescoping to allow adjustment to various sizes/styles of bicycles. The first bar member placement under and over struts (and between wheel spokes ) deters unauthorized use by requiring removal before wheel can be rotated. A padlock may also be provided to secure the stand/anti-theft device to the frame and/or fixed object to further deter unauthorized use. Because of the hooked over and open bearing up surface design, no clamp is needed to attach the deployed stand it adapts to many different sizes and styles. When the riding of the bicycle is desired, the device is removed from between the spokes, folded and collapsed and conveniently carried or strapped to the frame or left in the car when racing, minimizing weight and wind resistance.

14 Claims, 1 Drawing Sheet

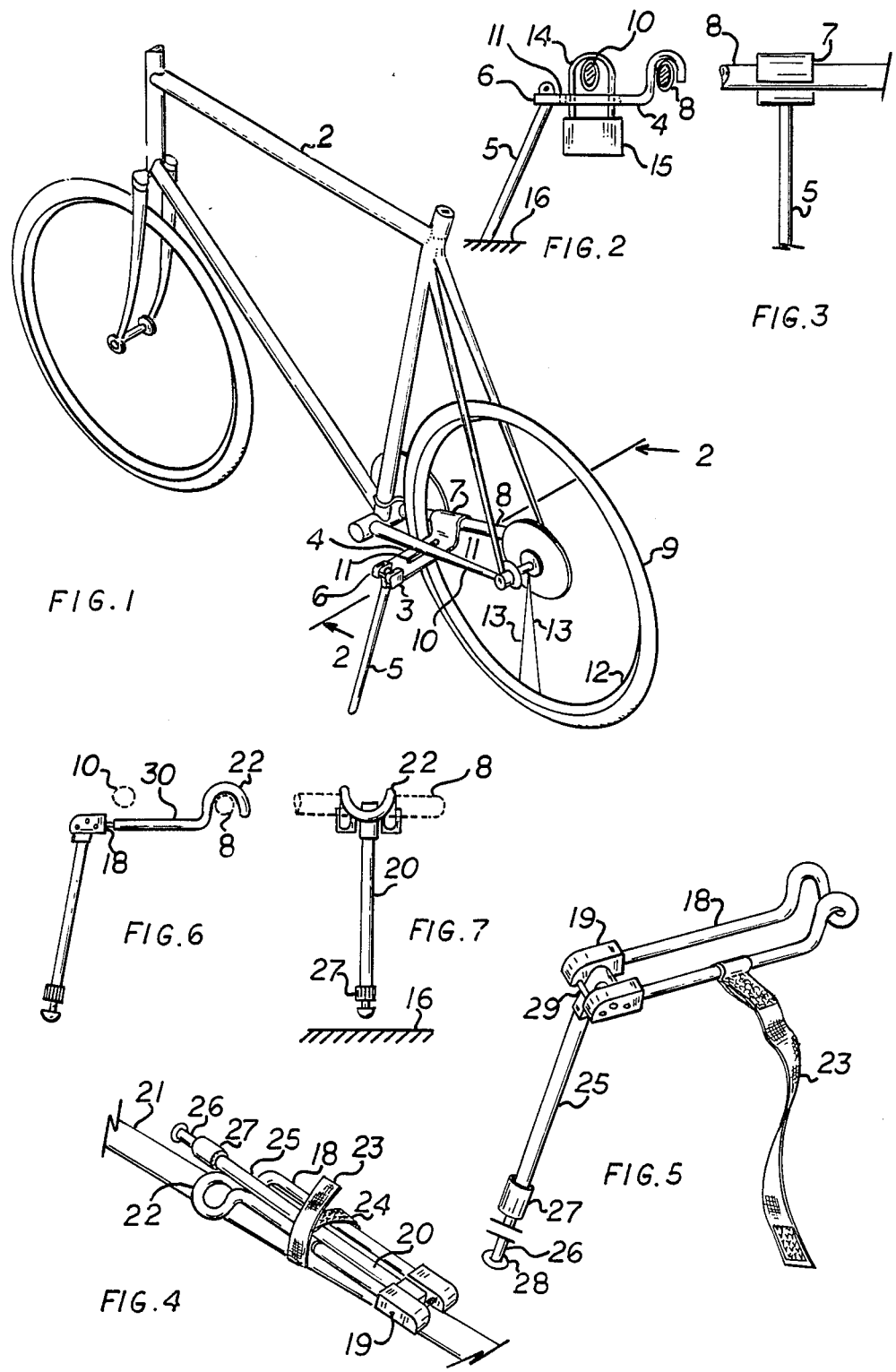

BICYCLE STAND AND ANTI-THEFT DEVICE

FIELD OF THE INVENTION

This invention relates to two wheeled vehicles or bicycle accessories, more specifically to portable bicycle supporting stands and theft deterrent devices.

BACKGROUND OF THE INVENTION

The primary objectives of a portable bicycle stand are to:
(1) deploy to allow quick and convenient support of the bicycle in an upright position when the bicycle is not being used; (2) allow quick and easy removal/movement of the device to a stowed position when bicycle is to be used; and (3) allow full and unhindered use of the bicycle when the device is stowed. Stand must also be very reliable to prevent damage to the bicycle. Stand should also be light weight, easy to maintain, rugged in construction, pleasing in appearance and low in cost. When the stand is used in each of the two operating modes (support and stowed), a minimum of effort to convert from one mode to another mode is also desirable.

The primary objectives of a bicycle theft deterrent device is to: (1) easily deploy to prevent wheel rotation and/or secure the bicycle to a fixed object when the bicycle is not being used; (2) allow quick and easy removal/movement to stowed position of the device when bicycle is to be used; and (3) allow full and unhindered use of the bicycle when the device is stowed. Device also must be very reliable in preventing theft. Also similar to the stand, it should be light weight, easy to maintain, rugged in construction, pleasing in appearance and low in cost. When the stand is used in each of the two operating modes (support and stowed), a minimum of effort to convert from one mode to another mode is also desirable.

Currently, even though some of the objectives for deployment and use are similar, separate devices and methods are used to accomplish these bicycle stand and anti-theft securing objectives. These separate devices may accomplish each of their individual objectives (in one or both of the operating modes), but other individual objectives or objectives of the other device poorly or not at all.

STANDS

A basic type of bicycle stand device is a "kick stand". The kick stand is clamped or otherwise securely attached to the bicycle frame. A hinged bar is kicked into one of two positions. A standing or deployed position, where the bar is projecting out and down to the ground, supports the bicycle in an upright position when not in use. A stowed position, where the bar is raised and generally held parallel to one portion of the frame, allows portability and full use of the bicycle. Other types of stands include: stands placed on the ground to cradle the bicycle; and hinged double projecting bars attached to the bicycle.

The prior art "kick stand" approach to bicycle support has limitations, especially when implemented in racing bicycle applications. The clamp typically used to attach the kick stand adds weight and wind resistance. Welded placements, drilled holes and space in (or on) the bicycle frame to accommodate the kick stand adds further cost, and weight. Clearance between pedals and frame may also have to be increased to accommodate the kick stand, still further increasing cost, weight and wind resistance. Other types of stands have limited portability (e.g., ground placed cradles) or add still further weight, cost and wind resistance (e.g., double projecting bars).

The ability of any one of the prior art bicycle stands to adapt to a variety of sizes and styles of bicycles is limited. Bicycle sizes range from units for children to large adult sizes, while styles range from heavy duty dirt bikes to lightweight racing styles. Portable bicycle stands suitable for one size and/or style can not be generally applied to the frames of other sizes and styles.

A common type of prior art bicycle security device is a padlock with an elongated link and/or hasp secured around the frame and through the spokes of one of the wheels to prevent rotation of the wheel. The padlock device may also include an attached wire rope/chain to be secured around or to a fixed object, further securing the bicycle. Other locking methods and devices include: removal of necessary component (e.g., a wheel) when bicycle is stored; locked chains or wire rope (without an elongated link or hasp) to secure both wheels/frame of the bicycle; steering column locks; and motion alarms.

The prior art elongated link/hasp padlock approach to bicycle security also has limitations, again especially when implemented in racing bicycle applications. The bulky, elongated link/hasp must be transported during riding of the bicycle, creating the need for a temporary storage/attachment to the person (rider) or bicycle. The storage/attachment requires additional cost, weight and wind resistance. The elongated padlock may also have to be restrained from movement during riding, adding still further cost and weight. The time required to store-/attach, restrain, unrestrain, and detach/remove the elongated padlock in addition to locking and unlocking for every trip may also be unacceptable.

Other types of security devices also have limitations. If a locked cable is used to secure the bicycle frame/wheels, further weight (padlock plus cable) is added and cable may be more easily cut (as compared to the hardened link or hasp of a padlock). Alarms, steering column locks and wheel removal may not be effective in deterring unauthorized removal.

What is needed is a single portable bicycle security and stand device that is light weight and can easily be stowed for compact transport. This device would avoid the duplication and many problems and disadvantages of the separate prior art systems, while meeting both sets of objectives.

None of the prior art known to the applicant provides the combination of locking and support stand features of the present invention.

SUMMARY OF THE INVENTION

The principal and secondary objects of the invention are:

To provide a lightweight deployable and portable support device for a bicycle in an upright position;

To provide a deterrent against the unauthorized use of the bicycle when the device is deployed;

To be able to adapt to many styles and sizes of bicycles; and

To provide a compact size device when device is not deployed.

These and other objects are achieved by a deployed device projecting through the spokes of a rear wheel and supporting from the side a portion of the bicycle frame. A first bar member is placed between spokes and one end is hooked over a first frame strut. This first bar member bears up against the lower portion of a second parallel strut while held in place by the hooked first strut. A second projecting member is hinged at a first end to the other end of the first bar and engages the ground at the second end to support the bicycle in a nearly upright position. The projecting element is also capable of telescoping to allow adjustment to various sizes/styles of bicycles. The first bar member placement under and over struts (and between wheel spokes) deters unauthorized use by requiring removal before wheel can be rotated. A padlock may also be provided to secure the stand/anti-theft device to the frame and/or fixed object to further deter unauthorized use. Because of the hooked over and open bearing up surface design, no clamp is needed to attach the deployed stand and it adapts to many different sizes and styles. When the riding of the bicycle is desired, the device is removed from between the spokes, folded and collapsed and conveniently carried, strapped to the frame, or left elsewhere, minimizing weight and wind resistance.

BRIEF DESCRIPTION OF THE DRAWINGS

FIG. 1 shows a perspective view of a stand/anti-theft device supporting a bicycle in an upright position;

FIG. 2 shows a rear cross sectional view of the device locked to a supported bicycle frame;

FIG. 3 shows a side view of the device in a supporting position;

FIG. 4 shows a perspective view of an alternate embodiment in a folded position strapped to a portion of a bicycle frame;

FIG. 5 shows a perspective view of the alternated embodiment in a supporting position;

FIG. 6 shows a rear view of the alternate embodiment; and

FIG. 7 shows a side view of the alternate embodiment.

DESCRIPTION OF THE PREFERRED EMBODIMENT

FIG. 1 shows a perspective view of a stand/anti-theft device supporting a bicycles in an upright position. Bicycle 2 (shown partially for clarity) is being supported in a generally upright position by the device 3. The device 3 consists of a first bar element 4 pivotally attached to a second bar element 5 by a hinge 6. The bar elements in this embodiment are made from flat aluminum (or other lightweight metal or plastic) plate or rods. The first bar element is bent at one end to form a hook 7 which is shaped and dimensioned to hold and attach over the top of the first of the parallel struts 8, which form part of the frame and attach to each side of the wheel bearing at the center of rotation of the rear wheel 9. The bottom of the second strut 10 of the bicycle 2 bears against a bearing surface on the first bar element 4 proximate to slot 11. The end opposite the hook 7 of the first bar element is hinged 6, shaped and dimensioned to maintain an open (supporting) orientation between the elements while supporting the bicycle 2 in three point (two wheels and stand) configuration, with the bicycle leaning slightly but generally in an upright position. The circumferential portion or rim 12 of the wheel 9 is radially supported by spokes 13 (only shown partially for clarity), but the device will function with any discontinuous radial support of the rim that can be penetrated by the device. The first bar element 4 is placed between the spokes 13 and prevents rotation while bicycle is supported. This anti-rotation function may assists stability on uneven or slanted ground surfaces, but a flat horizontal surface is desirable. The anti-rotation function also assists in deterring theft, as the support must be removed, carried/stowed away prior to use. Time and actions required to remove the device may deter theft.

FIG. 2 shows a rear cross sectional view from line 2—2 (shown in FIG. 1). The device is shown padlocked to a supported bicycle frame. The link 14 and locking body of padlock 15 is placed into slot 11 (shown dotted in this figure) of first bar element 4. This prevents removal of the device from between the spokes and therefore riding of the bicycle without unlocking the padlock. No elongated link extending from one strut to another or around the frame and wheel is required. The second bar member 5 is at the end of its hinged 6 travel, and in a position to support the struts 8 and 10 from a horizontal surface 16. In another configuration, a cable or chain can be attached to the link 14 and attached to a fixed object to further secure the standing bicycle against possible unauthorized use.

FIG. 3 shows a side view of the device in a supporting position. The hooked end 7 rests on the top of the first strut 8 which is part of the bicycle frame. The second bar element 5 projects down to engage the ground or other supporting surface.

FIG. 4 shows a perspective view of an alternate embodiment device in a stowed and folded position strapped to a portion of a bicycle frame. This preferred embodiment of the device has a hooked double bar element 18 which functions similarly to the first bar 4 shown in FIG. 1. The double bar element is attached to a pivot 19 which is also attached to a telescoping leg 20. The telescoping leg is folded into the double bar element to create a compact size to be attached to a portion of the bicycle frame 21. The hooked and mating end 22 of the double bar element 18 is shaped and dimensioned to hook over the first strut 8 (similar to FIG. 1 and as shown in FIG. 6) and also to form a cupped mating surface which conforms to and is contiguous with the non-rotating frame portion 21 of the bicycle. The folded device is attached to the frame portion by a strap 23 having a hook and vane (detachable) fastener 24. The double bar element is composed of aluminum, plastic or other bar or tube in a light weight U-shaped configuration. The pivot 19 is primarily composed of a rigid plastic components rotating around a metal pivot pin.

The telescoping leg 20 is made up of two tubular components, a first tubular component attached at one end to the pivot 19. The first tubular component 25 has an internal diameter slightly larger than the external diameter of the second tubular component 26. This allows the second tubular componeont to slide transversely within the internal diameter of the first tubular member in a telescoping manner. A twist type of clamp 27 fixes the relative positions of the tubular components, in this case, a minimum length is achieved to obtain a compact size for transport strapped to the bicycle frame or carried by the rider or left at home. The eccentric element of the twist clamp 27 is manually twisted and forced against the second tubular component, retaining the tubular components in an adjustably fixed position by friction until the eccentric is untwisted.

FIG. 5 shows a perspective view of the alternate embodiment of the device in an open, bicycle supporting position. The strap 23 is slidably or adhesively attached to one side of the double bar element 18. The second tubular component 26 is telescoped to an extended position and held in place by the twist clamp 27 to the first tubular component 25. An elastomeric tip 28 is provided to protect the interface with the supporting ground surface (see FIG. 7, and similar to FIG. 2). The pivot 19 also includes one or more fixed pins 29 which join the ends of the double bar and act as a stop to preclude further opening of the telescoping leg component 25. Alternate embodiments could include a ratchet type of positioning restraint for added stability.

FIG. 6 shows a rear view of the alternate embodiment in a open supporting position similar to that shown in FIG. 2. The struts of the bicycle 8 and 10 are shown dotted for clarity. An elastomeric cover 30 has been provided on the aluminum double bar 18 to protect the hooked over surfaces of the strut 8, the lower bearing surface portion of strut 10 and the portion of the strapped frame surface 21 (shown in FIG. 4) mating with the cupped end surface 22. In this embodiment, the covering 30 is a tube covering nearly all of the double bar element. A padlock (similar to the one shown in FIG. 2) could also be provided to further secure the device against theft, if the double bars are closely spaced or additional structure is provided between the double bars to prevent removal when padlocked.

FIG. 7 shows a side view of the alternate embodiment. The cupped and hooked end 22 is placed over strut 8 (shown dotted for clarity), while the telescoping leg 20 projects down towards the supporting horizontal plane 16. The knurled twist clamp 27 is loosened to allow the telescoping leg to contact the ground and then tightened to allow the device to support and provide anti-theft protection for the bicycle.

While the preferred embodiment of the invention has been shown and described, changes and modifications may be made therein within the scope of the appended claims without departing from the spirit and scope of this invention.

What is claimed is:

1. A two-wheeled vehicle stand and anti-theft device for supporting a range of vehicle frame sizes on a ground surface, said vehicle having a spoked wheel and at least two generally parallel struts having upper and lower surfaces and supporting said wheel, said device comprising:
   a first holding bar element shaped and dimensioned at a first end surface to partially hook over said upper portion of the first of said struts while projecting between said spokes through said wheel and freely bearing against a lower portion of the second of said struts at a second bearing surface; and
   a second standing bar element pivotally attached at one end to the second end of said first element, said second element shaped and dimensioned to contact said ground and support said vehicle in a generally upright position when said first element is holding and bearing against said structural members.

2. The device as claimed in claim 1, wherein said first bar element also comprises a mating surface shaped and dimensioned to mate with a portion of said vehicle frame.

3. The device as claimed in claim 2 wherein, said stand also comprises means for detachably holding said bar elements to a portion of said frame.

4. A two-wheeled vehicle stand and anti-theft device for supporting a range of vehicle frame sizes on a ground surface, said vehicle having a spoked wheel and at least two generally parallel struts supporting said wheel, said device comprising:
   a first holding bar element shaped and dimensioned at a first end surface to hook over a portion of the first of said struts while projecting between said spokes through said wheel and bearing against a portion of the second of said struts at a second bearing surface;
   a second standing bar element pivotally attached at one end to the second end of said first element, said second element shaped and dimensioned to contact said ground and support said vehicle in a generally upright position when said first element is holding and bearing against said structural members;
   wherein said first bar element also comprises a mating surface shaped and dimensioned to mate with a portion of said vehicle frame;
   wherein, said stand also comprises means for detachably holding said bar elements to a portion of said frame; and
   wherein said means for holding comprises a flexible strap attached to one of said bar elements, said strap shaped and dimensioned to secure said mating surface against said frame.

5. The device as claimed in claim 4, wherein said second bar element comprises:
   a major tubular component:
   a smaller tubular component having an outside diameter less than the inside diameter of said major tubular component, said smaller tubular component telescopically attached to said major tubular component; and
   means for adjustably fixing the relative transverse positions of said components.

6. The device as claimed in claim 5, wherein said means for adjustably fixing comprises a twist clamp attached to said major tubular component capable of clamping said smaller tubular component.

7. The device as claimed in claim 6, which also comprises:
   an elastomeric tip on said ground contact end of said second bar element; and
   a protective cover over said bearing surface, said mating surface, and said holding portions of said first bar element.

8. The device as claimed in claim 7, wherein said pivot attachment comprises:
   a first hinge element attached to said second end of said first bar element;
   a second hinge element attached to one end of said second bar element;
   a pivot pin rotatively attaching said first and second hinge elements; and
   a fixed pin shaped and dimensioned to stop rotational travel of said hinge elements.

9. The device as claimed in claim 8, wherein said flexible strap also comprises a detachable hook and vane fastener.

10. The device as claimed in claim 9 which also comprises a padlock having a link and body shaped and dimensioned to secure said first bar element to one of said struts.

11. The device as claimed in claim 1, wherein said holding bar first end mating surface is arc-shaped and when placed over the upper portion of one of a range of sizes of said first strut, generally limits sliding motion of said first bar in a direction generally perpendicular to the major dimension of said first strut and parallel to said ground.

12. The device as claimed in claim 11, wherein said bearing surface is generally straight and when first member is held by said holding surface, said bearing surface is under one of a range of sizes of said second strut.

13. The device as claimed in claim 12, wherein said first bar element's mating surface is arc-shaped and dimensioned to be held against a range of sizes of said frame portion.

14. The device as claimed in claim 1, wherein a link of said padlock is an elongated U-shape, dimensioned to secure the first bar element to a range of two wheeled vehicle sizes.

* * * * *